United States Patent Office 3,337,493
Patented Aug. 22, 1967

3,337,493
DURABILITY OF RUBBER WITH 4-AMINOALKYL-OR 4-HALOALKYLDIHYDROQUINOLINES
John Herbert New, Surbiton, England, and Joseph Patrick Brown, Geufron, Llangollen, Wales, assignors to Monsanto Chemicals Limited, London, England, a British company
No Drawing. Filed June 24, 1964, Ser. No. 377,510
Claims priority, application Great Britain, June 28, 1963, 25,731/63
13 Claims. (Cl. 260—45.8)

This invention relates to the production of novel rubber compositions having improved durability.

It is known that rubber is liable to deteriorate under conditions of normal use, and that to a large extent this deterioration is due to the action of atmospheric oxygen. There are a number of substances which when incorporated into rubber confer on it a certain measure of protection against the action of oxygen; the use of such a substance (termed as antioxidant) in the production of rubber articles is therefore a usual practice.

We have now found that a certain class of dihydroquinoline derivatives are useful as new antioxidants for rubber. Moreover, certain members can be used in light-colored rubbers since they show very little tendency to discoloration.

The invention accordingly comprises a process for the production of rubber having improved durability, in which a 4 - aminoaliphatic - 2,2 - dialiphatic - 1,2 - dihydroquinoline, a 4-halogenoaliphatic-2,2-dialiphatic-1,2-dihydroquinoline or a salt of one of these compounds is incorporated in the rubber.

A typical 4 - aminoaliphatic - 2,2 - dialiphatic - 1,2-dihydroquinoline is 4-diethylaminomethyl-2,2-dimethyl-1,2-dihydroquinoline and a typical 4-halogenoaliphatic-2,2-dialiphatic-1,2-dihydroquinoline is 4-chloromethyl-2,2-dimethyl-1,2-dihydroquinoline.

The dihydroquinolines and their salts can be used for the protection of vulcanized or unvulcanized rubber. In the production of a vulcanized rubber having improved durability, the dihydroquinoline or its salt is normally incorporated into the rubber prior to vulcanization, and the mixture is subsequently vulcanized.

In the 4-aminoaliphatic and 4-halogenoaliphatic-2,2-dialiphatic-1,2-dihydroquinolines, the aliphatic groups in the 2-position and the aliphatic portion of the 4-aminoaliphatic or 4-halogenoaliphatic group can each be for example an alkyl group, for instance a methyl, ethyl or butyl group, a cycloalkyl group, for instance a cyclohexyl group, or an aralkyl group, for instance a benzyl group. The amino portion of the 4-aminoaliphatic group and a halogen atom in a 4-halogenoaliphatic group is usually linked to the α-carbon atom of the aliphatic portion. Preferably each aliphatic group is a lower alkyl group, especially a methyl group; the preferred compounds are accordingly 4-aminomethyl-2,2-dimethyl-1,2-dihydroquinolines and 4-halogenomethyl-2,2-dimethyl-1,2-dihydroquinolines.

The useful 4-aminoaliphatic-2,2-dialiphatic-1,2- dihydroquinolines, 4 - halogenoaliphatic - 2,2 - dialiphatic-1,2-dihydroquinolines, and their salts include compounds where the dihydroquinoline nucleus is unsubstituted apart from the groups in the 2- and 4- positions, and compounds where one or more other nuclear substituents is present. Such a substituent can be for example a halogen atom, such as fluorine, chlorine, or bromine; an alkoxy group, such as a methoxy or ethoxy group; a hydroxy group; an amino group; a nitro group; an aliphatic group, for instance an alkyl, cycloalkyl or aralkyl group (as exemplified above); or an aromatic group, for instance an aryl group, such as a phenyl or tolyl group.

The amino portion of the 4-aminoaliphatic group in a 4 - aminoaliphatic-2,2-dialiphatic - 1,2-dihydroquinoline can be a primary group $NH_2$, a secondary group NHR, or a tertiary group NRR', where R and R' each represent an aliphatic or aromatic radical, or where in the tertiary group NRR', R and R' together represent a radical that forms a ring with the nitrogen atom. An aliphatic radical R or R' can be for example an alkyl, cycloalkyl or aralkyl group, as exemplified above. An aromatic group R or R' can be for example an aryl group such as for instance a phenyl or tolyl group or one of these groups having a substituent, for example a halogen atom, an alkoxy group, or a tertiary amino group, such as a dialkylamino group, so that R or R' can be for instance a chlorophenyl, ethoxyphenyl or dimethylaminophenyl group. Where the group NRR' is cyclic it can be saturated, for example a 1-pyrrolidinyl, piperidino, 1-hexamethylenimino, or morpholino group, or unsaturated, for example (in quaternary salt form) a pyridyl group.

A preferred class of 4-aminoaliphatic-2,2-dialiphatic-1,2-dihydroquinolines comprises those where the amino portion of the 4-aminoaliphatic group is a group —NRR' in which both R and R' are aliphatic groups, or in which R and R' form a saturated ring with the nitrogen atom. Of this class, the 4-aminoaliphatic-2,2-dialiphatic-1,2-dihydroquinolines and their salts where the dihydroquinoline nucleus contains at most one substituent apart from those in the 2- and 4- positions are most preferred. This class of compounds can be used in light-colored rubber since their tendency to discoloration is very slight.

Of the compounds where the amino portion of the 4-aminoaliphatic group is an aromatic-amino group, a preferred class comprises those where the amino group is a secondary group NHR. High activities are shown by compounds where R is an alkoxyphenyl or dialkylaminophenyl group.

Where a group R or R' is aromatic, the dihydroquinoline nucleus can be unsubstituted apart from the groups in the 2- and 4- positions, or it can contain one or more substituents, for example halogen atoms or alkoxy groups.

The 4-halogenoaliphatic group where present is preferably a monohalogenoaliphatic group, but it can be one containing two or more halogen atoms. The preferred halogens are chlorine and bromine.

High activities are shown by 4-halogenoaliphatic-2,2-dialiphatic-1,2-dihydroquinolines that contain an alkoxy group in the dihydroquinoline nucleus. In such compounds the dihydroquinoline nucleus can also contain one or more other substituents, for example one or more halogen atoms.

A salt of a 4-aminoaliphatic or 4-halogenoaliphatic-2,2-dialiphatic-1,2-dihydroquinoline for use in the process of the invention can be an acid addition salt or a quaternary ammonium salt. An acid addition salt can be a salt of the dihydroquinoline with an inorganic acid, for example a hydrohalide salt such as for instance a hydrochloride, hydrobromide or hydroiodide, a sulfate or phosphate; or a salt of a dihydro quinoline with an organic acid, for example an oxalate, benzene-sulfonate or picrate. A quaternary ammonium salt can be for example a quaternary halide or sulfate such as for instance a (dihydroquinolyl) methyl trialkyl ammonium chloride.

The 4 - aminoaliphatic-2,2-dialiphatic-1,2-dihydroquinoline and their salts can be obtained as described in copending application of J. P. Brown, Ser. No. 319,663, and the 4 - halogenoaliphatic-2,2-dialiphatic-1,2-dihydroquinolines and their salts as described in copending application of J. P. Brown, Ser. No. 188,518, now U.S. Patent No. 3,149,117.

Specific examples of dihydroquinolines and their salts that can be used as rubber antioxidants according to the present invention are:

4(diethylaminomethyl)-2,2 - dimethyl - 1,2 - dihydroquinoline;
4(diethylaminomethyl) - 2,2-dimethyl - 1,2 - dihydroquinoline hydrochloride;
4-piperidinomethyl-2,2-dimethyl-1,2-dihydroquinoline;
4-morpholinomethyl-2,2-dimethyl-1,2-dihydroquinoline;
4-morpholinomethyl - 2,2 - dimethyl - 1,2 - dihydroquinoline hydrobromide;
4-morpholinomethyl - 2,2 - dimethyl - 6 - ethoxy-1,2-dihydroquinoline;
4-morpholinomethyl - 2,2 - dimethyl - 7 - bromo-1,2-dihydroquinoline;
4(2',6'-dimethylmorpholinomethyl) - 2,2 - dimethyl - 1,2-dihydroquinoline;
4-anilinomethyl-2,2-dimethyl-1,2-dihydroquinoline;
4(p-phenetidinomethyl)-2,2-dimethyl - 1,2 - dihydroquinoline;
4(p-phenetidinomethyl) - 2,2 - dimethyl-3,6,8-tribromo-1,2-dihydroquinoline;
4(p-dimethylaminoanilinomethyl)-2,2-dimethyl - 1,2 - dihydroquinoline;
4(p-dimethylaminoanilinomethyl) - 2,2-dimethyl - 3,6,8-tribromo-1,2-dihydroquinoline;
4(p-dimethylaminoanilinomethyl) - 2,2 - dimethyl - 3,6,8-tribromo-1,2-dihydroquinoline hydrobromide;
4-chloromethyl-2,2-dimethyl-1,2-dihydroquinoline;
4 - chloromethyl-2,2-dimethyl - 6 - methoxy-1,2-dihydroquinoline;
4 - chloromethyl - 2,2 - dimethyl-6-ethoxy-1,2 - dihydroquinoline;
4 - chloromethyl - 2,2 - dimethyl-6-ethoxy-1,2 - dihydroquinoline hydrochloride;
4-bromomethyl - 2,2 - dimethyl-6-ethoxy - 1,2 - dihydroquinoline hydrobromide; and
4-bromoethyl-7-bromo - 2,2 - dimethyl-6-ethoxy - 1,2 - dihydroquinoline.

The 4-aminoaliphatic- and 4-halogenoaliphatic-2,2-dialiphatic-1,2-dihydroquinolines and their salts are effective antioxidants for both natural and synthetic rubber. Synthetic rubbers which can be used include polymers of 1,3-butadienes, for instance 1,3-butadiene itself and isoprene, copolymers of 1,3-butadienes with other monomers, such as styrene, acrylonitrile, isobutylene or methyl methacrylate, and polyolefin rubbers, for instance ethylene-propylene copolymers.

The additive can be incorporated into the rubber by conventional means, using for example a roll mill or an internal mixer. Where the process is used to produce a vulcanized rubber having improved resistance to deterioration, the antioxidant is normally incorporated into the rubber prior to vulcanization together with other commonly used ingredients, such as for instance zinc oxide, stearic acid, a filler, a vulcanizing agent and a vulcanization accelerator. The vulcanization proper, in which the mixture so obtained is heated, is carried out at a temperature appropriate to the particular rubber concerned, for example at a temperature of about 135°–155° C. where the composition is based on natural rubber, or at a temperature of about 140°–160° C. where the composition is based on a styrene-butadiene rubber.

Where a dihydroquinoline or one of its salts is used to protect an unvulcanized rubber, incorporation can be by milling into the solid rubber, but very often, and particularly where the rubber is synthetic, the antioxidant (preferably a free base rather than a salt) is more conveniently added to a latex or solution of the rubber, for example one obtained during its manufacture. An additive used in this way is generally referred to as a stabilizer for the synthetic rubber.

The amount of the dihydroquinoline or its salt incorporated in the rubber can vary between wide limits, but in general it has been found preferable to use from 0.2 to 3.0 parts by weight, and particularly from 0.5 to 2.0 parts by weight, per hundred parts by weight of rubber. Amounts somewhat outside these limits can sometimes be employed, for instance from 0.1 to 5.0 parts of the additive per 100 parts of rubber. Very satisfactory results have been obtained using about 1.5 parts by weight of the antioxidant per hundred parts by weight of rubber.

The invention is illustrated by the following example:

*Example*

This example describes the production of samples of vulcanized rubber each containing a 4-aminomethyl- or 4 - halogenomethyl-2,2-dimethyl-1,2-dihydroquinoline or dihydroquinoline salt as antioxidant.

The effectiveness of the antioxidant was assessed by the following test method, which is based on the fact that an antioxidant retards the rate at which the stress required to produce a given extension in a sample of rubber decreases while the rubber is "aged," that is, subjected to attack by atmospheric oxygen at an elevated temperature. Measurements were made on a sample which was unstressed during aging and on a sample which was stressed. The rate of decrease being dependent on the tension in the rubber irrespective of the presence or absence of an antioxidant.

A masterbatch of the following composition was compounded on a laboratory mill.

|  | Parts by weight |
| --- | --- |
| Pale crepe | 100 |
| Zinc oxide | 5 |
| Stearic acid | 1 |
| Blancfixe | 50 |
| Titanium dioxide | 5 |
| Sulfur | 2.5 |
| Diphenylguanidine | 1.0 |

A portion of the masterbatch was taken, and the antioxidant was milled into it in an amount equivalent to 1.5 parts by weight per 100 parts by weight of rubber in the masterbatch.

A number of rectangular bands, each having side walls 79 mm. in length and 4 mm. x 1 mm. in cross section and thickened end walls 11 mm. in length, were moulded from the rubber stock by vulcanizing at 153° C. for 30 minutes.

The stress required to extend the bands in their original or "unaged" condition to 1½ times their unstretched length was determined using a Baldwin machine by taking one band, stretching it to 50% extension, releasing, and again stretching to 50% extension, the stress required for the second extension being the figure recorded.

Two other bands were placed in an air oven at 90° C., one of the bands being supported so that except for its own weight it was unstressed, while the other was extended over hooks so spaced that the length of the band was 44±0.5% more than its unstretched length.

After 48 hours, the bands were removed from the oven, and after cooling, the stress required to extend each to 1½ times its original length was measured using the same procedure as for the original unaged band.

Corresponding measurements were made on a control set of bands moulded from a further portion of the masterbatch containing no antioxidant.

The results are given in the table below.

Where a band contained an antioxidant and was unstressed during aging, the stress required to extend it to 1½ times its unstretched length was only slightly less after the 48 hours of the test than at the beginning, whereas for the corresponding control band, the stress fell to ¾ of its original value over the same period. Where a band was stressed during aging, the stress required to extend it to 1½ times its unstretched length after the 48 hours was considerably higher for a band containing an antioxidant than for the control. The 4-aminomethyl- and 4-halogenomethyl-2,2-dimethyl-1,2-dihydroquinolines were thus effective antioxidants. The three bromine atoms designated "tribromo" occupy three of the positions 3, 5, 6, 7, and 8 in the dihydroquinoline nucleus, probably the 3-, 6-, and 8- positions.

| Antioxidant | Percent original stress retained after 48 hours at 90° C. | |
|---|---|---|
| | Unstressed During Aging | Stressed During Aging |
| 4-diethylaminomethyl-2,2-dimethyl-1,2-dihydroquinoline | 93 | 29 |
| 4-morpholinomethyl-2,2-dimethyl-1,2-dihydroquinoline | 91 | 40 |
| 4(p-phenetidinomethyl)-2,2-dimethyl-tribromo-1,2-dihydroquinoline | 91 | 35 |
| 4(p-dimethylaminoanilinomethyl)-2,2-dimethyl-3,6,8-tribromo-1,2-dihydroquinoline hydrobromide | 97 | 58 |
| 4-chloromethyl-2,2-dimethyl-6-ethoxy-1,2-dihydroquinoline hydrochloride | 88 | 38 |
| 4-bromomethyl-7-bromo-2,2-dimethyl-6-ethoxy-1,2-dihydroquinoline | 93 | 23 |
| None | 75 | 9 |

It is intended to cover all changes and modifications of the examples of the invention herein chosen for purposes of disclosure which do not constitute departures from the spirit and scope of the invention.

What is claimed is:

1. Rubber subject to atmospheric oxidation selected from the class consisting of natural rubber, elastomeric polymers and copolymers of 1,3-butadienes, and polyolefin rubbers of improved durability by having incorporated therein an antioxidant amount of a compound selected from the group consisting of a dihydroquinoline of the formula

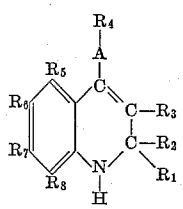

where $R_1$ and $R_2$ are lower alkyl, $R_3$ is selected from a group consisting of hydrogen and halogen, A is lower alkylene, $R_4$ is selected from a group consisting of $NH_2$, lower alkylamino, cyclohexylamino, benzylamino, arylamino, 1-pyrrolidinyl, piperidino, 1-hexamethyleneimino-morpholino, and 2,6-dimethylmorpholino, $R_5$, $R_6$, $R_7$, and $R_8$ are selected from a group consisting of hydrogen, halogen, lower alkoxy, hydroxy, amino, nitro, lower alkyl, cyclohexyl, benzyl, and aryl, acid addition salts wherein the anion is a halide, sulfate, phosphate, sulfonate, oxalate, or picrate and quaternary ammonium halides and sulfates thereof.

2. Rubber according to claim 1 wherein the rubber is vulcanized.

3. Rubber according to claim 1 in which the amount of antioxidant is from 0.2 to 3.0 parts by weight per hundred parts by weight of rubber.

4. Rubber according to claim 1 in which $R_3$, $R_5$, $R_6$, $R_7$, and $R_8$ are hydrogen and $R_4$ is

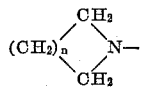

where $n$ is an integer at least 2 but not more than 4.

5. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4-[di(lower alkyl)aminomethyl]-2,2-dimethyl-1,2-dihydroquinoline.

6. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4-[di(lower alkyl)aminomethyl]-2,2-dimethyl 6-lower alkoxy-1,2-dihydroquinoline.

7. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4-(arylaminomethyl)-2,2-dimethyl-1,2-dihydroquinoline.

8. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4-(lower alkoxy phenylaminomethyl)-2,2-dimethyl-1,2-dihydroquinoline.

9. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4-[di(lower alkyl)aminophenylmethyl]-2,2-dimethyl-1,2-dihydroquinoline.

10. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4-diethylaminomethyl-2,2-dimethyl-1,2-dihydroquinoline.

11. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4-morpholinomethyl-2,2-dimethyl-1,2-dihydroquinoline.

12. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4(p-phenetidinomethyl)-2,2-dimethyltribromo-1,2-dihydroquinoline.

13. Rubber subject to atmospheric oxidation selected from the class consisting of natural rubber, elastomeric polymers and copolymers of 1,3-butadienes, and polyolefin rubbers of improved durability by having incorporated therein an antioxidant amount of 4(p-dimethylaminoanilinomethyl)-2,2-dimethyl-3,6,8-tribromo-1,2-dihydroquinoline hydrobromide.

References Cited

UNITED STATES PATENTS

| 2,203,899 | 6/1940 | Dunbrook et al. | 260—800 |
| 2,713,047 | 7/1955 | Beaver et al. | 260—45.8 |
| 2,748,100 | 5/1956 | Harris et al. | 260—45.8 |
| 2,973,335 | 2/1961 | Stasiunas | 260—37 |
| 3,149,117 | 9/1964 | Brown | 260—283 |

DONALD E. CZAJA, *Primary Examiner.*

LEON J. BERCOVITZ, *Examiner.*

M. J. WELSH, *Assistant Examiner.*